US006708079B2

(12) United States Patent
Mason, II

(10) Patent No.: US 6,708,079 B2
(45) Date of Patent: Mar. 16, 2004

(54) OPTICAL VEND-SENSING SYSTEM FOR CONTROL OF VENDING MACHINE

(75) Inventor: Paul L. Mason, II, Inwood, WV (US)

(73) Assignee: Automated Merchandising Systems, Kearneysville, WV (US)

( * ) Notice: Subject to any disclaimer, the term of this patent is extended or adjusted under 35 U.S.C. 154(b) by 0 days.

(21) Appl. No.: 09/870,586

(22) Filed: Jun. 1, 2001

(65) Prior Publication Data

US 2002/0179620 A1 Dec. 5, 2002

(51) Int. Cl.$^{7}$ .................................................. G01N 9/04

(52) U.S. Cl. ........................... 700/236; 700/231; 221/2; 221/7; 221/21; 250/223 R; 250/221; 250/216

(58) Field of Search ................................ 700/231, 236; 221/2, 7, 8, 21, 194; 250/222.2, 224, 559.29, 216, 221, 223 R

(56) References Cited

U.S. PATENT DOCUMENTS

| | | | | | |
|---|---|---|---|---|---|
| 1,848,874 | A | * | 3/1932 | Gerald | 356/432 |
| 3,041,462 | A | * | 6/1962 | Ogle | 250/221 |
| 3,537,091 | A | | 10/1970 | Schenkenberg | |
| 3,914,579 | A | | 10/1975 | Shigemori et al. | 235/61.7 B |
| 4,127,771 | A | * | 11/1978 | Sick | 250/221 |
| 4,252,250 | A | | 2/1981 | Toth | |
| 4,359,147 | A | | 11/1982 | Levasseur | |
| 4,402,609 | A | * | 9/1983 | Fetzer et al. | 356/640 |
| 4,412,607 | A | | 11/1983 | Collins et al. | |
| 4,494,675 | A | | 1/1985 | Stutsman | |
| 4,573,606 | A | | 3/1986 | Lewis et al. | |
| 4,776,487 | A | | 10/1988 | Kurosawa et al. | |
| 4,869,392 | A | | 9/1989 | Moulding et al. | |
| 4,871,054 | A | | 10/1989 | Murray | |
| 5,026,983 | A | * | 6/1991 | Meyn | 250/223 R |
| 5,084,845 | A | | 1/1992 | Levasseur | 367/96 |
| 5,111,962 | A | | 5/1992 | Oden | |
| 5,201,429 | A | | 4/1993 | Hikosaka et al. | |
| 5,207,784 | A | | 5/1993 | Schwartzendruber | |
| 5,229,749 | A | | 7/1993 | Yenglin | |
| 5,238,145 | A | | 8/1993 | Pippin | |
| 5,273,183 | A | | 12/1993 | Tuttobene | |
| 5,280,845 | A | | 1/1994 | Leight | |
| 5,303,844 | A | | 4/1994 | Muehlberger | |
| 5,344,043 | A | | 9/1994 | Moulding et al. | |
| 5,346,466 | A | | 9/1994 | Yerlikaya et al. | |
| 5,490,610 | A | | 2/1996 | Pearson | |
| 5,625,198 | A | | 4/1997 | Chigira | |
| 5,651,476 | A | | 7/1997 | Percy et al. | |

(List continued on next page.)

FOREIGN PATENT DOCUMENTS

| | | |
|---|---|---|
| EP | 432 996 A | 12/1989 |
| EP | 432996 | 6/1991 |
| JP | 2257386 | 10/1990 |
| JP | 2-257386 | 12/1997 |
| JP | 9-326075 | 12/1997 |

OTHER PUBLICATIONS

NAIS Sensors Brochure, Aromat Corporation, XPE 001 30M1296, 1996, p. 147.

SUNX Catalog; 1996, pp. 28–29.

*Primary Examiner*—Patrick Mackey
(74) *Attorney, Agent, or Firm*—Davidson Berquist Klima & Jackson LLP

(57) ABSTRACT

An optical vend-sensing system for reliably detecting the dispensing of an article, is presented. The system includes two parallel reflecting surfaces, each mounted at opposite sides of a vend space through which the article falls upon selection by a consumer. An emitter generates an optical beam which is reflected off each of the reflecting surfaces such that the reflected beam traverses across the vend space. A detector senses the reflected beam and communicates with a machine control unit. In response to the detector sensing that the reflected beam has been interrupted, the machine control unit terminates the vending operations of a mechanism controlling the dispensing of the article.

43 Claims, 3 Drawing Sheets

U.S. PATENT DOCUMENTS

| | | | | |
|---|---|---|---|---|
| 5,813,568 | A | | 9/1998 | Lowing |
| 5,847,389 | A | | 12/1998 | Mertins et al. |
| 5,884,806 | A | | 3/1999 | Boyer et al. |
| 5,922,030 | A | | 7/1999 | Shank et al. |
| 5,927,539 | A | | 7/1999 | Truitt et al. |
| 6,064,921 | A | | 5/2000 | Pippin et al. |
| 6,354,716 | B1 | * | 3/2002 | Chen et al. ................. 362/268 |
| 6,384,402 | B1 | * | 5/2002 | Hair et al. .............. 250/223 R |

* cited by examiner

FIG. 2B
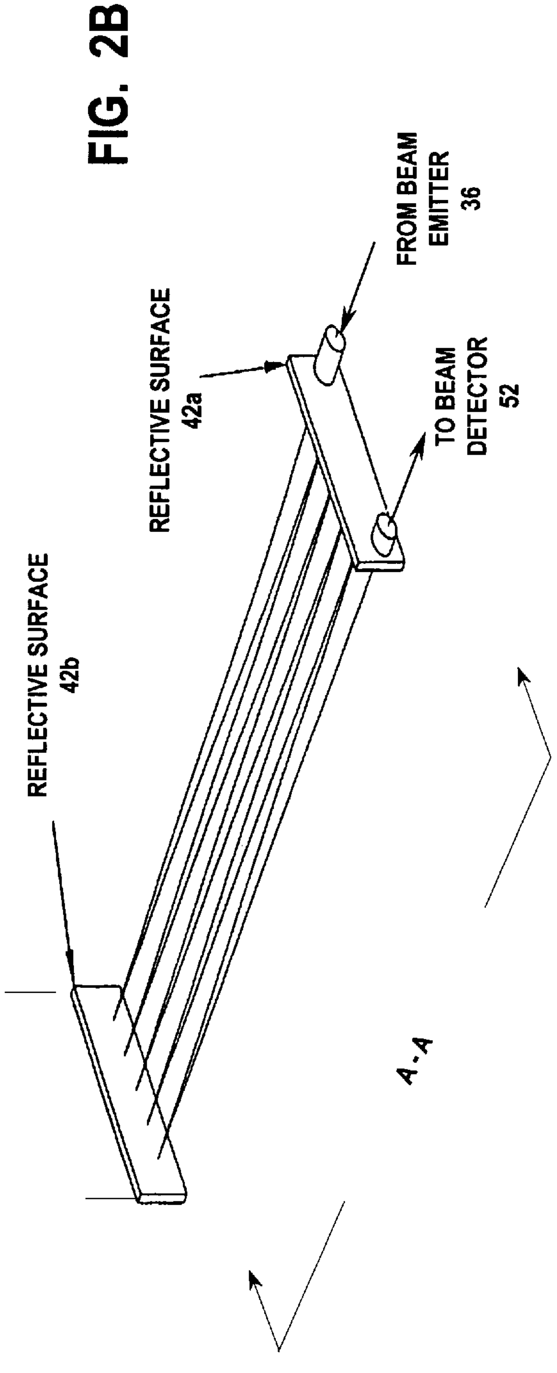
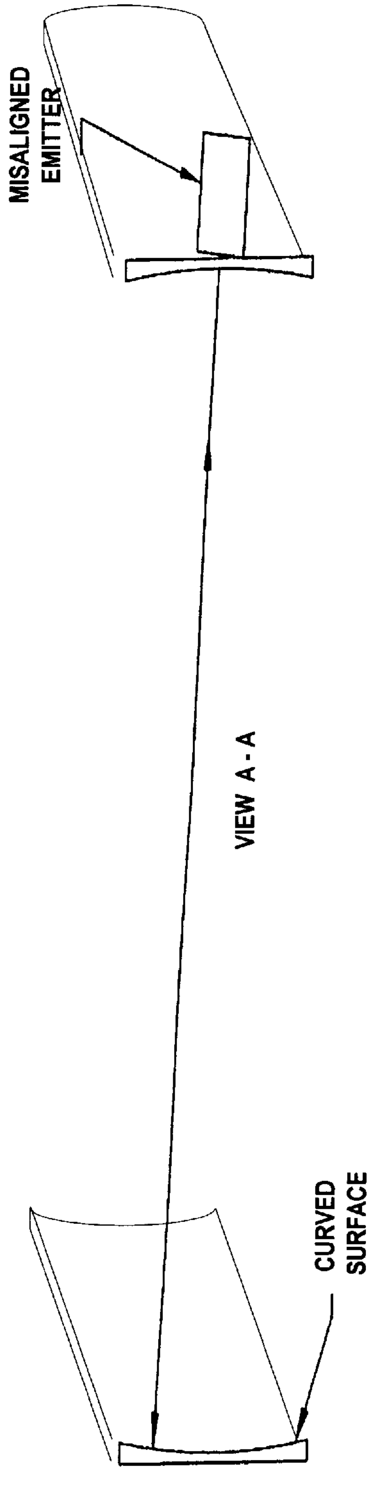
FIG. 2C

OPTICAL VEND-SENSING SYSTEM FOR CONTROL OF VENDING MACHINE

BACKGROUND OF THE INVENTION

1. Reservation of Copyright

The disclosure of this patent document contains material, which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

2. Field of the Invention

The present invention relates to machines that dispense selected objects, and more particularly to a sensing system that reliably detects dispensed objects.

3. Description of Background Information

Glass front vending machines are machines designed for vending packaged snack foods and candy products of various sizes and shapes. These machines generally have a selector panel, located off to one side of the glass front, and use some form of horizontal trays, partitioned into columns, to store the products to be vended.

Typically, after a consumer makes the requisite payment and enters the desired selection on the selector panel, the forward-most product from the selected column is ejected or dislodged and the product drops freely into a delivery hopper at the bottom of the machine. The space that the product falls through is the area between the fronts of the columns and the back of the glass front, commonly referred to as the vend space.

It is important that vending machines operate in a reliable manner and provide consumers with the selected product without the need to expend unusual effort to obtain the product. With this said, there exists various events that can compromise the reliability of vending machine operations. For example, the spatial orientation and wrinkling of packages, the content distribution of packages, the tumbling of packages through the vend space, and empty spiral pockets can all contribute to the mis-vending of products.

Moreover, the construction of conventional glass-front vending machines complicates reliable vending. For example, conventional glass-front vending machines are generally modularly constructed, allowing the vertically-spaced rows of product columns, and/or laterally spaced columns per row to be changed either at the time the machine is ordered by its purchaser, in the field, or both. Such row and column changes may require the reconfiguration of sensors and associated circuitry, which compromises the reliability of sensing operations.

Some vending machines determine the dispensing of a selected product by employing a detection scheme that radiates a single beam within a predefined area. As the selected product passes through the predefined area, the beam detects the product and presumes that the product has been dispensed. However, in such a configuration, the beam often lacks sufficient coverage and the selected product may fail to break the single beam and escape detection. This may be especially true of vending machines that offer products that vary substantially in size. In such cases, larger areas may be required to accommodate larger products, so that a single beam detection scheme may fail to detect smaller products that escape the beam.

Other vending machines determine the dispensing of a selected product by providing sensors, which sense the vibrations or impact on an outlet chute by a relatively heavy product, such as a can or bottle. However, impact or vibrational sensing may not perform reliably when some of the offered products are relatively light in weight, such as, for example, potato chips or pretzels.

Moreover, regardless of the detection schemes used, products that are selected often become lodged or stuck. Such lodging may occur even after the product has been detected as being dispensed, resulting in mis-vends and forcing consumers to expend unusual effort to obtain the product or get their money back.

SUMMARY OF THE INVENTION

Apparatuses, systems, and methods consistent with the principles of the present invention address the need to provide an optical vend-sensing system that reliably detects dispensed objects. Accordingly, an apparatus, system and method, consistent with these principles as embodied and broadly described herein, include a dispensing mechanism configured to initiate vending operations and dispense an article into a vend space through which the article falls upon selection by a consumer. The present invention further includes two reflecting surfaces, each mounted at opposite sides of the vend space and positioned substantially parallel to each other and an electromagnetic emitter configured to generate at least one optical beam. The beam is reflected off of each of the reflecting surfaces, such that the reflected electromagnetic beam traverses across the vend space.

The present invention also includes an electromagnetic radiation detector, configured to detect the reflected beam from the reflected surfaces and signal when the selected article has been dispensed, based on when the selected article interrupts the reflected beam as it falls through the vend space.

The present invention further includes a machine control unit, which communicates with the detector and dispensing mechanism, and is configured to receive the signal from the detector indicating that the article has been dispensed. In response to receiving the signal from the detector, machine control unit terminates the vending operations of the dispensing mechanism.

BRIEF DESCRIPTION OF THE DRAWINGS

The present invention is described in more detail with reference to the attached drawings, in which:

FIGS. 2B, 2C provide views of reflecting surfaces employed by optical vend-sensing system, constructed and operative in accordance with principles of the present invention.

DETAILED DESCRIPTION

The following detailed description of the present invention refers to the accompanying drawings that illustrate embodiments consistent with this invention. Other embodiments are possible and modifications may be made to the embodiments without departing from the spirit and scope of the invention. Therefore, the following detailed description is not meant to limit the invention. Rather the scope of the invention is defined by the appended claims.

The embodiments described below may, instead, be implemented in many different embodiments of software, firmware, and hardware in the entities illustrated in the figures. The actual software code or specialized control hardware used to implement the present invention is not limiting of the present invention. Thus, the operation and behavior of the present invention will be described with the understanding that modification and variations of the embodiments are possible, given the level of detail present herein.

It is to be noted that details of vending machines and associated control and sensing systems may be as described in co-pending U.S. application Ser. No. 09/261,221 which was filed on Mar. 3, 1999 in the name of Hair et al. The contents of this co-pending application is herein expressly incorporated by reference in its entirety.

The present invention is directed to a vend-sensing system capable of reliably detecting when a product has been dispensed after a consumer enters a product selection to commence a vending cycle. In one embodiment, this may be achieved by providing at least one optical beam that is reflected numerous times. The beam reflections form a series of angled rays that span the cross-sectional area of the vend space and are configured to have an inter-beam spacing small enough to detect the smallest product being dispensed. When a product is released, it falls through the vend space, interrupts the reflected beam, and a detector senses the absence of the beam. The detector subsequently signals that the product has been dispensed. A machine control unit receives the signal and terminates the vending cycle. If, during the vending cycle, the machine control unit fails to receive the signal from the detector, the machine control unit initiates a corrective action. In this manner, the vend-sensing system of the present invention is capable of reliably detecting dispensed products and, equally important, mitigate the likelihood of mis-vending.

Figure 1:
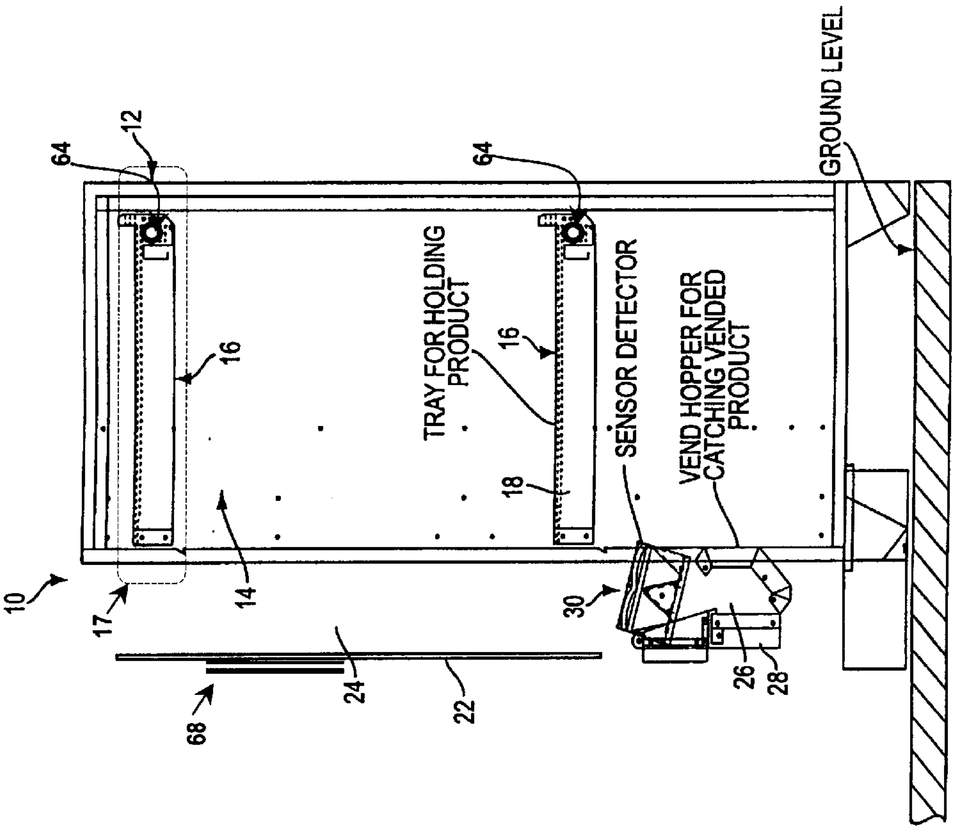
FIG. 1 is a schematic vertical longitudinal sectional view of a glass front vending machine provided with an optical vend-sensing system, constructed and operative in accordance with principles of the present invention.

FIG. 1 schematically depicts a vending machine 10, equipped with the optical vend-sensing system, constructed and operative in accordance with an embodiment of the present invention. Much of the conventional structure has been omitted.

In general, vending machine 10 includes a cabinet 12 having opposite sidewalls, a back wall, a top wall and a bottom wall, which cooperatively define a forwardly facing cavity 14 arranged to have a plurality of tray assemblies 16 mounted therein at a plurality of vertically spaced levels.

In the illustrated embodiment of FIG. 1, vending machine 10 is equipped with a dispensing unit 17 having tray assemblies 16. It will be appreciated that dispensing unit 17 may include electromechanical, magnetic, and/or motorized components. Each tray assembly 16 may contain a plurality of motorized horizontally arranged spirals (e.g., helix), which are spaced from one another widthwise of the tray, and each of which extends longitudinally in a front-to-rear depthwise direction of the tray. Each spiral may plug into the driving chuck of a respective drive motor 64, which is arranged to rotate the spiral about the longitudinal axis of the spiral.

In addition, right upstanding flanges 18 may be used for mounting tray assembly 16 to cabinet 12. As such, drawer-mounting hardware may be used to permit each tray assembly 16 to be pulled out like a drawer. Also, a rear flange may be used for mounting each spiral drive motor 64 assembly. Each tray assembly 16 may further include a horizontal tray surface, which underlies all of the spirals to provide support for the spirals and for the packaged products that are inserted within the respective upwardly-opening pockets formed between neighboring turns of the spirals. Some columns may have one spiral per column; others may have two coordinately counter-rotated spirals per column, with upstanding sidewall flanges mounted on the tray to divide columns from one another.

Moreover, spaced in front of the front edges of the tray assemblies 16 is an openable/lockable door (not shown) having a glass front 22, through which a prospective consumer may view the leading packaged products being offered by vending machine 10. The door, to one side of the glass front, may further include a selector panel 68, which includes a mechanism for accepting payment from the consumer and for selecting a product.

After a consumer selects a desired product, the vending cycle may be initiated by causing the respective spiral drive motor 64 assembly/assemblies of the respective column to rotate through a sufficient angular distance, in order to advance all of the products nested in the turns of the respective spiral. The products are advanced until the forward-most product loses support from below as it reaches the front of the respective tray support surface and drops through vend space 24 behind glass front 22, down into a vend hopper 26, where it can be retrieved by the consumer. In some representative implementations, vend space 24 may be configured to have a lateral width of approximately 18–26 inches and a front-to-rear depth of approximately 4 to 12 inches.

Figure 2A:
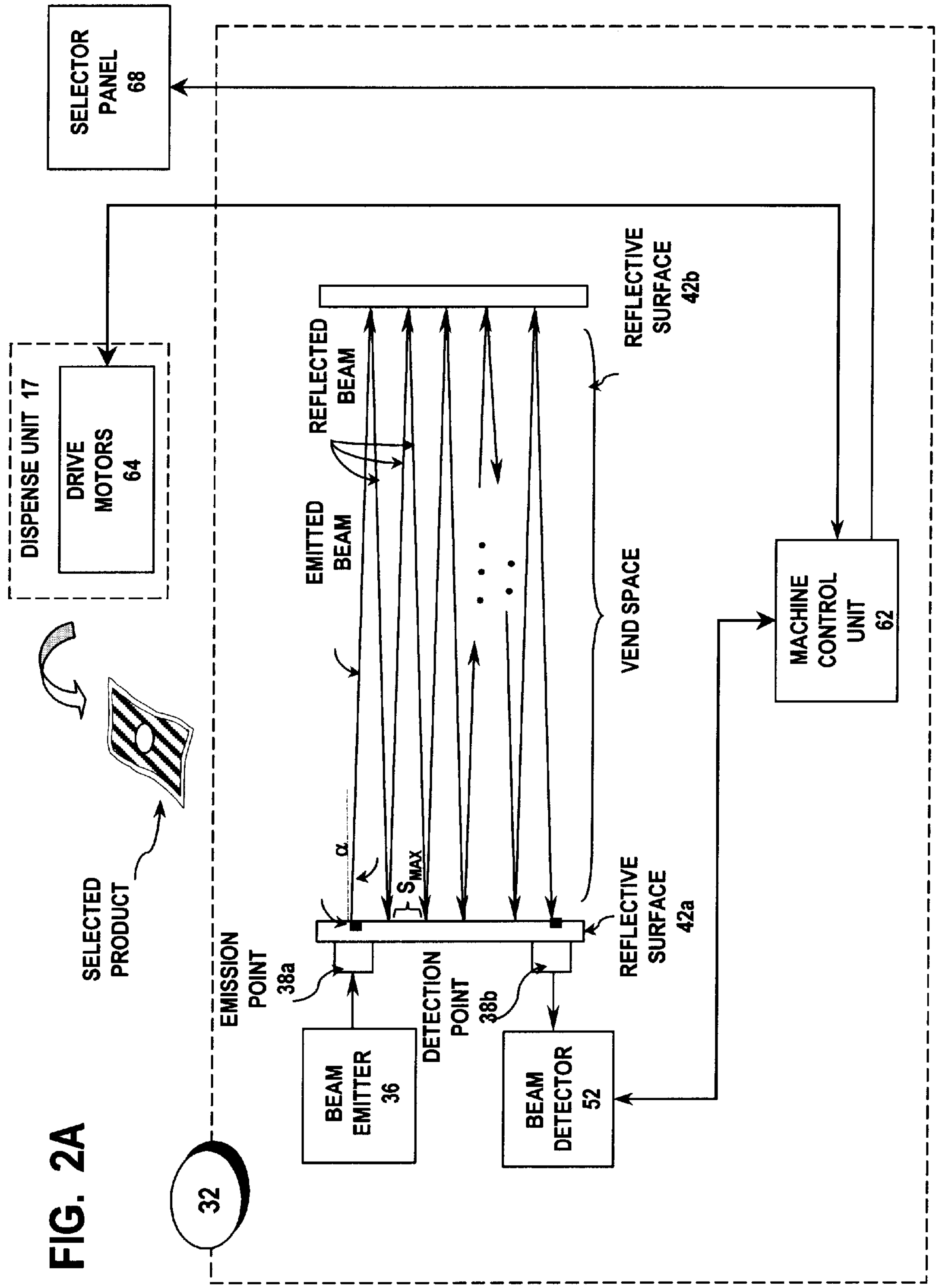
FIG. 2A is a functional block diagram depicting the elements of the optical vend-sensing system, constructed and operative in accordance with principles of the present invention.

Proximate to the vend hopper 26, at 30, vend-sensing system 32 may be disposed to reliably detect that a product has actually been dispensed. FIG. 2A depicts vend-sensing system 32, constructed and operative in accordance with an embodiment of the present invention. As indicated in FIG. 2A, optical vend-sensing system 32 comprises an electromagnetic radiation emitting element (emitter) 36, two reflective surfaces 42*a*, 42*b*, an electromagnetic radiation detecting element (detector) 52, and a machine control unit 62.

Vend-sensing system 32 employs emitter 36, which emits at least one optical beam. The emitted beam may be configured as a substantially non-dispersive optical beam, such as, for example, a collimated optical beam. To achieve such a beam, emitter 36 may comprise a highly directive light-emitting diode or a laser source. It will be appreciated that laser sources suitable for such operations may include, but are not limited to, Class 1–Class 3A laser devices, varying in output power from 1–5 mW and having wavelengths from 470 nm. to 670 nm. Moreover, such laser sources may be configured to operate in pulsed or continuous wave modes.

Vend-sensing system 32 also employs detector 52, which detects the electromagnetic radiation generated by emitter 36. Detector 52 is configured to spectrally match the radiated beam in order to adequately sense the beam, which, as will be described in further detail below, is designed to experience numerous reflections. Detector 52 outputs an electrical signal responsive to the sensed electromagnetic energy and may comprise, for example, a photo-diode or similar element suitable for such purposes. It will be appreciated that detector 52 may further comprise detection circuitry including elements (e.g., filters, amplifiers, etc.) having adjustable detection/trigger thresholds in order to discriminate between the radiated beam and ambient radiation.

Vend-sensing system 32 further employs a first and second reflective surface 42*a*, 42*b*, respectively, which are each mounted on opposite sides of vend space 24 to substantially span the cross-sectional area of vend space 24. Reflective surfaces 42_a_, 42_b_ may be mounted on the front and rear sides of vend space 24 or on the lateral sides of vends space 24. As indicated in FIGS. 2A, 2B, reflective surfaces 42_a_, 42_b_ are positioned substantially parallel to each other in order to accommodate the numerous reflections of the radiated beam, as noted above.

Reflective surfaces 42_a_, 42_b_ may comprise substantially flat mirrored surfaces. Alternatively, as illustrated in FIG. 2C, reflective surfaces 42_a_, 42_b_ may comprise curved mirrored surfaces (e.g., circularly-arced, parabolic, elliptical, etc.) or a plurality of linear mirrored segments arranged to achieve a substantially curved mirrored surface. Such curved surfaces may be configured to direct a reflected beam towards a centered, predetermined convergence point and are, thus, more forgiving of manufacturing imperfections and emitter 36 misalignment.

Vend-sensing system 32 also incorporates a machine control unit 62, operatively coupled to detector 52 and dispensing unit 17 to monitor and ensure the proper operation of the vending machine 10. As depicted in FIG. 2A, in one implementation, machine control unit 62 communicates with the vending drive motors 64 (controlling spiral rotations) of dispensing unit 17. Machine control unit 62 includes logic and associated circuitry to interface and communicate with detector 52 and dispensing unit 17, as well as track system parameters corresponding to these components. Such logic may include, for example, a processor with executable instructions.

By way of illustration, vend-sensing system 32 may be configured to operate as follows: emitter 36 generates a non-dispersive, collimated optical beam. The beam is emitted through an emission point 38_a_ located at one end of first reflective surface 42_a_. The beam travels from emission point 38_a_ across the lateral width of vend space 24 and is incident upon a second reflective surface 42_b_, which, as noted above, is substantially parallel to first reflective surface 42_a_. Emitter 36 may be configured to direct the beam from emission point 38_a_ at an emission angle $\alpha$ relative to the normal direction along the transverse plane, such that the beam is not perpendicular to second reflective surface 42_b_ upon incidence. Upon impinging second reflective surface 42_b_, the beam is reflected back at angle $\alpha$ and is incident on first reflective surface 42_a_ at a predetermined distance from emission point 38_a_.

As indicated in FIGS. 2A, 2B, the beam will continue to be reflected between first and second reflective surfaces 42_a_, 42_b_ for a predetermined number of times. For purposes of illustration, FIG. 2A depicts the reflected beam from a top elevation view; a more representative illustration of the actual path of the reflected beam during system 32 operations, is shown in FIG. 2B. The reflections form a series of rays which span vend space 24. By virtue of emission angle $\alpha$, the number of beam reflections between reflective surfaces 42_a_, 42_b_ may be configured to define a maximum inter-beam space $S_{max}$ between the reflected beams. This maximum inter-beam space $S_{max}$ may be sufficiently small enough to ensure the detection of an interrupted reflected beam caused by the smallest product falling through vend space 24. For example, in one implementation, the beam may have an emission angle $\alpha$ small enough to generate a number of beam reflections that provide an $S_{max}$ of approximately 0.25 inches.

As depicted in FIGS. 2A, 2B, after the predetermined number of reflections, the reflected beam reaches a detection point 38_b_, which is located at the other end of first reflective surface 42_a_, opposite to emission point 38_a_. The distance between detection point 38_b_ and emission point 38_a_ is configured to fully span the cross-sectional area of vend space 24. It will be appreciated that detection point 38_b_ may also be located on second reflective surface 42_b_ at the end opposite to emission point 38_a_, without compromising the operation of vend-sensing system 32.

At detection point 38_b_, the beam is received by detector 52, which, as noted above, is spectrally matched to the radiated beam in order to sense the reflected beam. Detector 52 may be configured with a detection threshold level that is generally selectable according to the desired detection sensitivity. Because detector 52 may be exposed to ambient light and other electromagnetic sources, the detector threshold level may be selected to ensure that only detected radiation above the threshold level represents the proper detection of the reflected beam.

Upon sensing the reflected beam, detector 52 generates an electrical signal containing a value indicative of the detected reflected beam. If a product falls through vend space 24 to interrupt or otherwise obstruct the reflected beam, detector 52 may be configured to generate an electrical signal with a value representing the failure to detect the reflected beam, based on the detector threshold level noted above. In the alternative, detector 52 may be configured to abstain from generating an electrical signal based on the detector threshold level.

Detector 52 communicates the electrical signal to machine control unit 62, which compares the communicated value with a stored reference value representing customary detected levels when the reflected beam is unobstructed. If the comparison indicates that detector 52 sensed the reflected beam, machine control unit 62 determines that a product has not been dispensed. Conversely, if the comparison indicates that detector 52 failed to sense the reflected beam, machine control unit 62 determines that a product has fallen through vend space 24, thereby interrupting the reflected beam, and registers that a product has been dispensed.

During the vending cycle, machine control unit 62 generally monitors and controls spiral drive motors 64 to permit the spiral containing the selected product to rotate until vend-sensing system 32 detects that the product has been dispensed. That is, upon failing to detect the reflected beam (caused by the selected product falling through vend space 24), the machine control unit 62 communicates with the respective spiral drive motors 64 to terminate rotation.

If, during the vending cycle, machine control unit 62 does not register that a product has been dispensed, machine control unit 62 may initiate a corrective action. Such corrective action may include, for example, communicating with selector panel 68 to notify the consumer that he is given the choice to have his form of payment refunded or to select another column's product. For example, if machine control unit 62 does not register that a selected product has been dispensed because a spiral pocket was left empty or the selected product is stuck, machine control unit 62 may communicate with selector panel 68 to display a message that the consumer may select another product. In this manner, vend-sensing system 32 will ensure that vending machine 10 will either properly vend a product or perform a corrective action to avoid mis-vending.

The foregoing description of embodiments of the present invention provides illustration and description, but is not intended to be exhaustive or to limit the invention to the precise form disclosed. Modifications and variations, either consistent with the above teachings or acquired from practice of the invention, are possible. For example, depending on the configuration of vending machine 10 and the products to be vended, a plurality of vend-sensing systems 32, as described herein, may be implemented to provide additional benefits.

Moreover, the processes of the present invention may be stored in any storage device, such as, for example, a computer system (non-volatile) memory, an optical disk, magnetic tape, or magnetic disk. The processes may also be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer or network device.

Accordingly, it will be appreciated by persons skilled in the art that the present invention is not limited to what has been particularly shown and described hereinabove. Rather, the scope of the present invention is defined only by the attached claims and their equivalents.

What is claimed:

1. An optical vend-sensing system for a vending machine having a dispensing mechanism configured to initiate vending operations and dispense an article into a vend space through which the article falls upon selection by a consumer, said optical vend-sensing system comprising:

two reflecting surfaces, each mounted on opposite sides of said vend space and positioned substantially parallel to each other;

an electromagnetic emitter configured to generate at least one optical beam which is reflected off of each of said reflecting surfaces such that the reflected beam traverses across said vend space at least two times; and an electromagnetic radiation detector configured to detect said reflected beam and generate a signal indicating when said article has been dispensed, wherein said detector generates said signal when said reflected beam has been interrupted by said article as it falls through said vend space.

2. The optical vend-sensing system of claim 1, further including a machine control unit in communication with said detector and said dispensing mechanism and configured to receive said signal from said detector indicating that said article has been dispensed.

3. The optical vend-sensing system of claim 2, wherein said detector is configured with a detection threshold level that discriminates against ambient electromagnetic sources and ensures the detection of the reflected beam.

4. The optical vend-sensing system of claim 3, wherein said detector generates said signal indicating an undetected reflected beam based on the detection threshold level.

5. The optical vend-sensing system of claim 4, wherein said detector supplies said signal to said machine control unit which compares said signal to a stored value in order to determine whether to terminate the vending operations of said dispensing mechanism.

6. The optical vend-sensing system of claim 5, wherein in response to receiving said signal from said detector indicating that said selected article has been dispensed, said machine control unit terminates the vending operations of said dispensing mechanism.

7. The optical vend-sensing system of claim 6, wherein, after vending operations have commenced, said machine control unit initiates a corrective action in response to a failure to receive said signal from said detector confirming that said article has been dispensed.

8. The optical vend-sensing system of claim 7, wherein said corrective action includes at least one of presenting said consumer with option to make another selection and presenting said consumer with option to receive return payment of said selected article.

9. The optical vend-sensing system of claim 1, wherein said beam is angled relative to the normal direction along the transverse plane to achieve a predetermined plurality of beam reflections between said reflecting surfaces.

10. The optical vend-sensing system of claim 9, wherein said predetermined plurality of beam reflections are configured to define an inter-beam area between said reflections small enough to accurately detect the dispensing of any vended article.

11. The optical vend-sensing system of claim 1, wherein said optical beam comprises a substantially non-dispersive optical beam.

12. The optical vend-sensing system of claim 1, wherein said emitter comprises a laser source.

13. The optical vend-sensing system of claim 1, wherein said reflecting surfaces comprise substantially flat mirrored surfaces.

14. The optical vend-sensing system of claim 1, wherein said reflecting surfaces comprise curved mirrored surfaces.

15. A vending machine, comprising:

a dispensing unit having a plurality of article containment regions and configured to perform vending operations and dispense an article through a vend space;

a payment and selection unit configured to communicate with said dispensing unit to initiate vending operations after a consumer has selected an article and satisfied payment for said selected article; and and optical vend-sensing system configured to communicate with said dispensing unit, said vend-sensing system including, two substantially parallel reflecting surfaces, each mounted at opposite sides of said vend space;

an electromagnetic emitter configured to generate at least one optical beam which is reflected off each of said reflecting surfaces such that said reflected beam traverses across said vend space at least two times; and an electromagnetic radiation detector configured to detect said reflected beam and generate a signal indicating when said selected article has been dispensed, wherein said detector generates said signal when said reflected beam has been interrupted by said selected article as it falls through said vend space.

16. The vending machine of claim 15, further including a machine control unit in communication with said detector and said dispensing mechanism and configured to receive said signal from said detector indicating that said selected article has been dispensed.

17. The vending machine of claim 16, wherein said detector is configured with a detection threshold level that discriminates against ambient electromagnetic sources and ensures the detection of the reflected beam.

18. The vending machine of claim 17, wherein said detector generates said signal indicating an undetected reflected beam based on the detection threshold level.

19. The vending machine of claim 18, wherein said detector supplies said signal to said machine control unit which compares said signal to a stored value in order to determine whether to terminate the vending operations of said dispensing mechanism.

20. The vending machine of claim 19, wherein in response to receiving said signal from said detector indicating that said selected article has been dispensed, said machine control unit terminates the vending operations of said dispensing mechanism.

21. The vending machine of claim 20, wherein, after vending operations have commenced, said machine control unit initiates a corrective action in response to a failure to receive said signal from said detector confirming that said selected article has been dispensed.

22. The vending machine of claim 21, wherein said corrective action includes at least one of presenting said consumer with option to make another selection and presenting said consumer with option to receive return payment of said selected article.

23. The vending machine of claim 15, wherein said beam is angled relative to the normal direction along the transverse plane to achieve a predetermined plurality of beam reflections between said reflecting surfaces.

24. The vending machine of claim 23, wherein said predetermined plurality of beam reflections are configured to define an inter-beam area between said reflections small enough to accurately detect the dispensing of any vended article.

25. The vending machine of claim 15, wherein said optical beam comprises a substantially non-dispersive optical beam.

26. The vending machine of claim 15, wherein said emitter comprises a laser source.

27. The vending machine of claim 15, wherein said reflecting surfaces comprise substantially flat mirrored surfaces.

28. The vending machine of claim 15, wherein said reflecting surfaces comprise curved mirrored surfaces.

29. The vending machine of claim 15, further including a transparent front to allow said consumer view articles to be vended.

30. A method of sensing an article dispensed from a vending machine having a dispensing mechanism configured to initiate vending operations and dispense an article into a vend space through which the article falls upon selection by a consumer, said method comprising:

emitting at least one optical beam, by an emitting element, such that said beam is reflected off two substantially parallel reflecting surfaces disposed at opposite sides of said vend space and said reflected beam traverses across said vend space at least two times;

detecting said reflected beam by a detecting element; and generating a signal, by said detecting element, indicating when said article was dispensed, wherein said detector generates said signal when said reflected beam has been interrupted by said article as it falls through said vend space.

31. The method of claim 30, further including monitoring the detection of said reflected beam by a machine control unit in communication with said detector and said dispensing mechanism and configured to receive said signal from said detector indicating that said article has been dispensed.

32. The method of claim 31, further including discriminating against ambient electromagnetic sources to ensure the detection of the reflected beam by configuring said detector with a detection threshold level.

33. The method of claim 32, wherein said detector generates said signal indicating an undetected reflected beam based on the detection threshold level.

34. The method of claim 33, wherein said detector supplies said signal to said machine control unit which compares said signal to a stored value in order to determine whether to terminate the vending operations of said dispensing mechanism.

35. The method of claim 34, further including terminating the vending operations of said dispensing mechanism in response to receiving said signal from said detector indicating that said article has been dispensed.

36. The method of claim 35, further including initiating a corrective action by said machine control unit after vending operations have commenced, in response to a failure to receive said signal from said detector confirming that said article has been dispensed.

37. The method of claim 36, wherein said corrective action includes at least one of presenting said consumer with option to make another selection and presenting said consumer with option to receive return payment of said selected article.

38. The method of claim 30, wherein said beam is angled relative to the normal direction along the transverse plane to achieve a predetermined plurality of beam reflections between said reflecting surfaces.

39. The method of claim 38, wherein said predetermined plurality of beam reflections are configured to define an inter-beam area between said reflections small enough to accurately detect the dispensing of any vended article.

40. The method of claim 30, wherein said optical beam comprises a substantially non-dispersive optical beam.

41. The method of claim 30, wherein said emitter comprises a laser source.

42. The method of claim 30, wherein said reflecting surfaces comprise substantially flat mirrored surfaces.

43. The method of claim 30, wherein said reflecting surfaces comprise curved mirrored surfaces.

* * * * *